United States Patent
Ulrich et al.

(10) Patent No.: US 11,293,397 B2
(45) Date of Patent: Apr. 5, 2022

(54) METHOD FOR TRANSMITTING DATA FROM A SENSOR TO A RECEIVER

(71) Applicant: Volkswagen Aktiengesellschaft, Wolfsburg (DE)

(72) Inventors: Per Ulrich, Braunschweig (DE); Marijo Topcic, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 218 days.

(21) Appl. No.: 16/081,540

(22) PCT Filed: Oct. 6, 2017

(86) PCT No.: PCT/EP2017/075465
§ 371 (c)(1),
(2) Date: Aug. 31, 2018

(87) PCT Pub. No.: WO2018/073021
PCT Pub. Date: Apr. 26, 2018

(65) Prior Publication Data
US 2021/0190028 A1   Jun. 24, 2021

(30) Foreign Application Priority Data
Oct. 20, 2016 (DE) ................... 10 2016 220 564.1

(51) Int. Cl.
*F02P 19/02* (2006.01)
*G08C 19/02* (2006.01)

(52) U.S. Cl.
CPC .......... *F02P 19/028* (2013.01); *F02P 19/023* (2013.01); *F02P 19/026* (2013.01); *G08C 19/02* (2013.01)

(58) Field of Classification Search
CPC .................................................. F02P 19/028
See application file for complete search history.

(56) References Cited

U.S. PATENT DOCUMENTS 5,025,653 A * 6/1991 Schuldt .............. G01N 33/0032
73/23.2
5,357,141 A * 10/1994 Nitschke ............. B60R 16/0315
280/735
(Continued)

FOREIGN PATENT DOCUMENTS

CN   101163945 A   4/2008
CN   101265849 A   9/2008
(Continued)

OTHER PUBLICATIONS

International Search Report of PCT Application No. PCT/EP2017/075465, dated Jan. 3, 2018.
(Continued)

*Primary Examiner* — Kevin R Steckbauer
(74) *Attorney, Agent, or Firm* — Pearl Cohen Zedek Latzer Baratz LLP

(57) ABSTRACT

A method for transmitting data from a sensor to a receiver by means of an analog interface, whereby, during a first period of time, the sensor transmits identifier data for identifying the type of the sensor and/or for identifying the type of a component associated with the sensor, and measurement signals of the sensor are only transmitted after the first period of time. In this context, it is also provided that the transmission of the identifier data serves to identify a specific sensor from a group of multiple sensors and/or a specific component that is associated with the sensor from a group of multiple components, whereby the multiple sensors of the appertaining group and/or the multiple components of the appertaining group have mechanically identical interfaces and consequently can fundamentally be employed alternatingly. A method according to the invention is advantageously suitable, among other things, for transmitting data from a cylinder pressure sensor—which is especially integrated into a glow plug of an internal combustion engine—
(Continued)

to a receiver, whereby this receiver can especially be integrated into a control unit, for instance, an engine control unit of the internal combustion engine. With such a method according to the invention, before measurement signals of the cylinder pressure sensor are transmitted, the engine control unit of the internal combustion engine can advantageously identify whether a defined, selected cylinder pressure sensor, and particularly a defined selected glow plug with an integrated cylinder pressure sensor, is also actually installed in the internal combustion engine.

13 Claims, 5 Drawing Sheets

(56) References Cited

U.S. PATENT DOCUMENTS

| | | | | |
|---|---|---|---|---|
| 6,032,109 A * | 2/2000 | Ritmiller, III | G01D 3/022 | 702/104 |
| 6,223,121 B1 * | 4/2001 | Ishida | F02D 41/1458 | 701/113 |
| 6,243,654 B1 * | 6/2001 | Johnson | H01R 13/665 | 439/620.09 |
| 6,331,822 B1 * | 12/2001 | Sato | G05B 15/02 | 340/3.22 |
| 6,943,669 B2 * | 9/2005 | Otterbach | G08C 19/02 | 340/12.33 |
| 7,089,099 B2 * | 8/2006 | Shostak | B60C 23/005 | 701/29.6 |
| 7,173,520 B2 * | 2/2007 | Desai | B60C 23/0416 | 340/442 |
| 7,313,467 B2 * | 12/2007 | Breed | G07C 5/008 | 307/9.1 |
| 7,444,210 B2 * | 10/2008 | Breed | G07C 5/008 | 307/9.1 |
| 7,564,251 B2 * | 7/2009 | Rupp | G08C 19/02 | 324/713 |
| 7,586,430 B2 * | 9/2009 | Engl | G06F 1/22 | 326/37 |
| 7,769,510 B2 * | 8/2010 | Denholm | G07C 5/0808 | 701/29.6 |
| 7,786,853 B2 * | 8/2010 | Ohl | G08C 19/02 | 340/511 |
| 8,169,311 B1 * | 5/2012 | Breed | G06F 3/0219 | 340/438 |
| 8,229,624 B2 * | 7/2012 | Breed | B60R 21/0132 | 701/36 |
| 9,365,413 B2 * | 6/2016 | Barrilado | B81B 7/008 | |
| 9,400,226 B2 * | 7/2016 | Sessego | G01P 21/00 | |
| 9,680,635 B2 * | 6/2017 | Hainz | H04L 47/801 | |
| 10,243,724 B2 * | 3/2019 | Grambichler | H04L 7/0091 | |
| 10,774,773 B2 * | 9/2020 | Henein | F02D 35/022 | |
| 2002/0012401 A1 * | 1/2002 | Karolys | G08C 19/02 | 375/257 |
| 2003/0184447 A1 * | 10/2003 | Otterbach | H04B 3/50 | 340/854.9 |
| 2004/0036591 A1 * | 2/2004 | Desai | B60C 23/0416 | 340/445 |
| 2005/0068195 A1 * | 3/2005 | Ohl | G08C 19/02 | 340/870.18 |
| 2006/0025897 A1 * | 2/2006 | Shostak | G08G 1/017 | 701/1 |
| 2006/0180371 A1 * | 8/2006 | Breed | B60R 21/01516 | 180/197 |
| 2007/0035316 A1 * | 2/2007 | Rupp | G08C 19/02 | 324/713 |
| 2008/0065290 A1 * | 3/2008 | Breed | G01L 17/00 | 701/31.4 |
| 2008/0129475 A1 * | 6/2008 | Breed | B60R 21/01516 | 340/438 |
| 2008/0143507 A1 * | 6/2008 | Cotton | B60C 23/0472 | 340/445 |
| 2008/0147271 A1 * | 6/2008 | Breed | B60R 21/0132 | 701/36 |
| 2009/0072671 A1 * | 3/2009 | Stelzer | G01L 9/0025 | 310/338 |
| 2009/0138241 A1 * | 5/2009 | Parachini | G01K 1/026 | 702/188 |
| 2010/0152947 A1 * | 6/2010 | Denholm | G07C 5/0808 | 701/29.6 |
| 2012/0089299 A1 * | 4/2012 | Breed | B60N 2/888 | 701/36 |
| 2014/0379242 A1 * | 12/2014 | Henein | F02D 35/022 | 701/104 |
| 2015/0229469 A1 * | 8/2015 | Hainz | H04L 7/0091 | 375/225 |
| 2017/0195754 A1 * | 7/2017 | Grambichler | H04L 47/801 | |
| 2021/0190028 A1 * | 6/2021 | Ulrich | F02P 19/02 | |

FOREIGN PATENT DOCUMENTS

| | | | | |
|---|---|---|---|---|
| CN | 104835306 A | 8/2015 | | |
| DE | 38 19 128 C1 | 12/1989 | | |
| DE | 198 29 214 A1 | 2/1999 | | |
| DE | 101 14 504 A1 | 10/2002 | | |
| DE | 101 49 332 A1 | 4/2003 | | |
| DE | 103 92 355 T5 | 5/2005 | | |
| DE | 10 2005 014 133 B3 | 6/2006 | | |
| DE | 10 2007 033 248 A1 | 4/2008 | | |
| DE | 11 2009 003 536 T5 | 5/2012 | | |
| EP | 1087212 | 3/2001 | | |
| JP | 2000073846 A * | 3/2000 | | Y02T 10/62 |
| WO | WO-9709567 A1 * | 3/1997 | | G01L 23/222 |
| WO | WO 03/082613 A1 | 10/2003 | | |

OTHER PUBLICATIONS

Search report for German Patent Application No. 10 2016 220 564.1, dated Oct. 13, 2017.
Notice of Allowance dated Jan. 15, 2021 for corresponding Chinese application No. 201780064882.X.

* cited by examiner

METHOD FOR TRANSMITTING DATA FROM A SENSOR TO A RECEIVER

CROSS-REFERENCE TO RELATED APPLICATIONS

This application is a National Phase Application of PCT International Application No. PCT/EP2017/075465, International Filing Date Oct. 6, 2017, claiming priority of German Patent Application No. 10 2016 220 564.1, filed Oct. 20, 2016, which is hereby incorporated by reference.

FIELD OF THE INVENTION

The invention relates to a method for transmitting data from a sensor to a receiver by means of an analog interface.

BACKGROUND OF THE INVENTION

It is a known procedure in diesel engines to fit one or more cylinders with glow plugs which have not only a glow pencil but also an integrated cylinder pressure sensor (a so-called PSG: pressure sensor glow plug). The measurement signal corresponding to the cylinder pressure is transmitted by the cylinder pressure sensor via an analog interface (e.g., a 3-wire interface consisting of a power supply, a ground (GND) and an output signal) to the engine control unit and it serves to regulate the course of the combustion. Such an evaluation of the cylinder pressure can be useful or necessary, especially in order to comply with European emission standard Euro 6.

Due to space considerations, a 4-pole, rotational-symmetrical coaxial plug is often used in order to establish contact between the glow plug and the cylinder pressure sensor. In this context, in addition to the above-mentioned contacts that connect the cylinder pressure sensor, there is also a high-current contact that supplies the glow pencil with electric energy. Owing to the rotational symmetry of the coaxial plug, it can be plugged in in any desired angular orientation and consequently virtually without the need for visual contact on the part of the technician. Owing to this rotational symmetry, however, the coaxial plug does not have a so-called coding system so that, if there are several variants of glow plugs that can be connected with the coaxial plug, it is not ensured by mechanical means that a previously defined glow plug will actually be used for the individual case in question. The use of such a (mechanical) coding system would mean that the rotational symmetry of the coaxial plug is limited, making it more difficult to plug in the coaxial plug in tight installation spaces. Moreover, in comparison to the above-mentioned coaxial plugs, the prior-art mechanically coded plugs normally have considerably larger dimensions, as a result of which they require a correspondingly larger installation space, which is usually not available in the area of the cylinder heads in modern diesel engines. Besides, larger plugs can detrimentally affect the vibration resistance of a measuring system comprising a cylinder pressure sensor.

German patent specification DE 10 2005 014 133 B3 describes an integrated circuit having a bi-directional mixed-signal single-wire interface via which the circuit can receive command information from a host and can then send processed analog signals to the host.

German patent application DE 101 14 504 A1 discloses a method for transmitting data from at least one sensor to a control unit via a two-wire line that serves to identify any sensors in the control unit and to implement several logical channels via the appertaining two-wire line. The at least one sensor receives the requisite electric energy from the control unit via the two-wire line and transmits sensor-specific data via this line.

German patent application DE 101 49 332 A1 discloses a method for transmitting data from a sensor to a control unit, whereby a value range that is available for coding the data that is to be transmitted is divided into three parts. The first part is used for the sensor values. The second part is used for status and error messages and the third part is used for sensor identification data, whereby the three parts are separate from each other and follow each other in consecutive order.

International patent application WO 03/082613 A1 describes a method for identifying the individual tire-pressure sensors in a motor vehicle by means of a control unit, whereby the data is transmitted by radio.

SUMMARY OF THE INVENTION

The invention is based on the objective of putting forward a way to implement a coding system in the case of a plurality of components—especially glow plugs with an integrated cylinder pressure sensor or with a cylinder pressure sensor that is independent of a glow plug—which are different but which, thanks to the identical mechanical interfaces, as alternatives, could nevertheless be integrated into a system, especially an internal combustion engine (for example, a diesel engine), so that it can be ensured or checked that, in an individual case, a previously defined component from among the plurality of different components is employed. In this context, the coding system that is to be implemented should have the least possible impact on the assembly of the system and/or should only increase the requisite installation space to the slightest extent possible.

This objective is achieved by means of a method according to patent claim 1. Advantageous embodiments of the method according to the invention are the subject matter of the additional patent claims and/or they ensue from the description of the invention that follows below.

According to the invention, a method for transmitting data from a sensor to a receiver by means of an analog interface is being put forward, whereby, during a first period of time, the sensor transmits identifier data for identifying the type of the sensor and/or for identifying the type of a component associated with the sensor, and measurement signals of the sensor are only transmitted after the first period of time. In this context, it is also provided that the transmission of the identifier data serves to identify a specific sensor from a group of multiple sensors and/or a specific component that is associated with the sensor from a group of multiple components, whereby the multiple sensors of the appertaining group and/or the multiple components of the appertaining group (group-internal in each case) have mechanically identical interfaces and consequently can be employed alternatingly, that is to say, they can at least be coupled to the receiver.

A method according to the invention is advantageously suitable, among other things, for transmitting data from a sensor associated with an internal combustion engine—especially data from a cylinder pressure sensor associated with a glow plug of an internal combustion engine—to a receiver, whereby this receiver can especially be integrated into a control unit, for instance, an engine control unit of the internal combustion engine. However, the control unit can also be provided to regulate the provision of an electric supply voltage to the glow plug that is preferably associated with the cylinder pressure sensor. With such a method according to the invention, before measurement signals of the cylinder pressure sensor have been transmitted, the receiver and especially the engine control unit of the internal combustion engine can advantageously identify whether a previously defined, selected cylinder pressure sensor, and particularly a defined selected glow plug with an integrated cylinder pressure sensor, is also actually installed in the internal combustion engine. This prevents an erroneous actuation of the internal combustion engine with the resultant drawbacks, particularly in terms of power delivery, fuel consumption and exhaust-gas emissions, among other things, due to incorrect measurement signals of the cylinder pressure sensor and/or an incorrect actuation of the glow plug by the engine control unit.

For instance, for identical as well as different internal combustion engines that are to be actuated by means of the same engine control units or by means of identical software stored on the engine control units, it is possible to employ glow plugs with glow pencils made of metal as well as glow plugs with glow pencils made of ceramic. However, in view of the fact that a cylinder pressure sensor is typically a component of a glow pencil since the pressure is to be transmitted mechanically via the glow pencil, cylinder pressure sensors comprising glow plugs which have metal filaments on the one hand and ceramic filaments on the other hand might no longer be application-neutral with respect to each other. Therefore, the precise detection of the cylinder pressure and the regulation of the combustion process that is based on it presuppose knowledge about the type of the cylinder pressure sensor that has been installed in the engine control unit. The same problem can be encountered when glow plugs of different manufacturers are used if these glow plugs have a mechanically identical design in terms of the interfaces for the integration into the internal combustion engine but if they are not application-neutral with respect to each other. Fundamentally, metal glow pencils on the one hand and ceramic glow pencils on the one hand can display different characteristics (for example, glow behavior—timing, temperature, resistance) and consequently might make it necessary for the engine control unit to undertake a different application. Moreover, cylinder pressure sensors can have different pressure ranges and different pressure-transmission characteristic curves. Variants can also be created by means of different part numbers or different hardware and software versions.

In a preferred embodiment of a method according to the invention, it can be provided that the identifier data comprises a start signal and/or an end signal and/or a synchronization signal and/or a disconnect signal. In this manner, it is possible to simplify and/or improve the unambiguous identification of useful data that is likewise transmitted along with the identifier data and that serves to allow the receiver to identify the type of the sensor and/or a component associated with the sensor.

In a likewise preferred manner, it can be provided that the identifier data is transmitted in the form of a sequence of two or more voltage signals having different voltage levels, whereby the voltage levels can have identical or different lengths, and whereby different sequences of the voltage signals and/or voltage levels of different magnitudes and/or voltage levels of different lengths define different types of sensors and/or types of components associated with the sensors and consequently represent differently coded useful data. On the one hand, this constitutes a relatively simple way to transmit the identifier data and, on the other hand, such voltage signals can also unambiguously differ from typical analog signals of a sensor, so that the transmission, as provided according to the invention, of the identifier data as well as of the measurement signals of the sensor can be advantageously carried out via the same analog interface. As long as the identifier data comprises a start signal and/or an end signal and/or a synchronization signal and/or a disconnect signal, it can be provided that this additional data or these additional signals likewise differ from each other and/or in comparison to the useful data in that they have different sequences of the voltage signals and/or voltage levels of different magnitudes and/or voltage levels of different lengths.

In order to achieve the most robust possible transmission of the identifier data, it can also be preferably provided for the voltage levels within a defined voltage level range to be at the greatest possible distance from each other. In this context, however, it should also be preferably provided for the voltage levels or the voltage level range to fall within an output voltage range of the measurement signals in order to ensure a differentiation between the transmitted identifier data and those signals that could be detected as an error message by the receiver. This can especially be the case if the receiver is configured in such a way that it identifies as errors all of the signals that are transmitted to it via the analog interface and that fall outside of the output voltage range of the measurement signals.

In another likewise preferred embodiment of a method according to the invention in which the identifier data is transmitted in the form of a sequence of two or more voltage signals having different voltage levels, it can be provided that at least one block containing several data bits is transmitted, whereby each data bit comprises one or more voltage signals. In order to improve the decoding of the identifier data, it can also be preferably provided for the data bits themselves to be coded. For this purpose, a Manchester code or Miller code, for instance, can be used.

A preferred refinement of such a method according to the invention can also provide that the block containing several data bits comprises several subblocks that each contain several data bits, whereby the data bits of the subblocks are or can be identical. This can be utilized for a redundant transmission of identifier data or at least of useful data that allows the identification of the type of the sensor and/or of a component associated with the sensor, as a result of which the identification accuracy of the identifier data can be increased.

In another preferred embodiment of a method according to the invention, it can be provided for the identifier data to be transmitted during an initialization phase and for the transmission of the identifier data to already have ended or (necessarily) to be ended by the end of the initialization phase. As a result, it can be prevented that a transmission of the measurement signals, which is provided for at the end of the initialization phase, might be detrimentally affected by an ongoing transmission of the identifier data. In this context, it can preferably be likewise provided for the end of the initialization phase to be reached as soon as the sensor has reached measuring readiness.

With the use of such a method according to the invention for transmitting data from a cylinder pressure sensor—which is especially integrated into a glow plug of an internal combustion engine—to a receiver (for example, an engine control unit), it can preferably also be provided for the end of the initialization phase to be reached as soon as the cylinder pressure sensor has detected the start of the internal combustion engine. In this context, it can especially preferably be provided for the start of the internal combustion engine to be ascertained on the basis of a defined pressure rise in a combustion chamber that is associated with the cylinder pressure sensor.

The indefinite articles ("a", "an", "of a", "of an"), especially in the patent claims and in the description that generally explains the patent claims, are to be understood as such and not as numbers. Therefore, components described in a concrete manner should be understood in such a way that they are present at least once and can also be present several times.

BRIEF DESCRIPTION OF THE DRAWINGS

The present invention will be explained in greater detail below on the basis of the embodiments presented in the drawings. The drawings show the following.

DETAILED DESCRIPTION OF THE INVENTION

Figure 1:
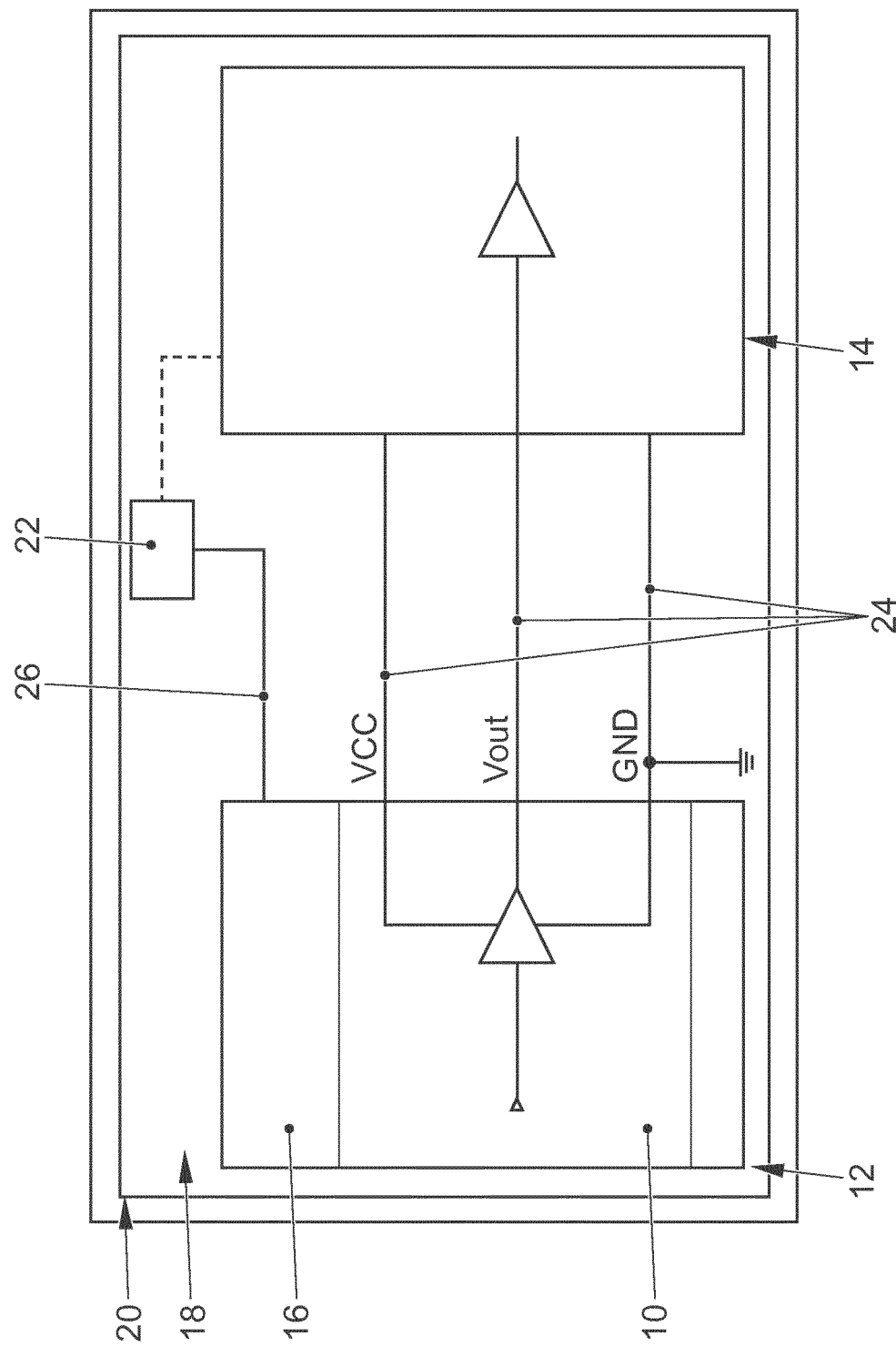
FIG. 1: a schematic view of a combination of a component (glow plug) comprising a (cylinder pressure) sensor and a receiver (engine control unit)

FIG. 1 shows a combination of a component 12 comprising a sensor 10 and a receiver 14, whereby the sensor 10 is electrically connected to the receiver 14 via an analog interface having three lines 24. The component 12 is, for instance, a glow plug 12 while the sensor 10 is a cylinder pressure sensor 10, whereby the cylinder pressure sensor 10, along with other components, specifically with a glow pencil 16, can be integrated into the glow plug 12 having the integrated cylinder pressure sensor 10. The receiver 14 is preferably configured in such a way that it concurrently constitutes a control unit or is integrated into such a unit. In particular, the function of the receiver 14 is carried out by an engine control unit 14 of an internal combustion machine. The internal combustion machine also comprises an internal combustion engine 18, especially a diesel engine, that can be actuated by an engine control unit 14, whereby the internal combustion engine 18 can be provided in order to deliver a drive output for a motor vehicle 20.

The engine control unit 14 supplies the cylinder pressure sensor 10 with electric power via two of the three lines 24 ($V_{CC}$ (+power supply line) as well as GND (ground)). With respect to the GND, the third line 24 ($V_{out}$) serves to transmit data from the cylinder pressure sensor 10 to the engine control unit 14. The engine control unit 14 regulates the supply of electric power to the cylinder pressure sensor 10 and evaluates, among other things, the analog measurement signal of the cylinder pressure sensor 10 in order to regulate the operation of the internal combustion engine 18 as a function of the measurement signals. Another (high-current) line 26 is provided for the transmission of high current from a separate power output 22 to the glow pencil 16 of the glow plug 12 in a manner regulated by the engine control unit 14.

An electronic system (not shown here) of the cylinder pressure sensor 10 integrated into the glow plug 12 is also capable of outputting two or more fixed voltage levels to the analog interface as an alternative to the measurement signal of the cylinder pressure sensor 10. This can be done in an analog output path of the cylinder pressure sensor 10 by means of a systematic switchover to fixed voltage values. Alternatively, in a cylinder pressure sensor 10 which internally functions digitally and in which the measured values are already present in digital form and are output to the analog interface via a digital-analog converter, said digital-analog converter can be actuated with fixed input values. The voltage levels that are achieved in this manner allow the transmission of information in digital form via the analog interface. Depending on the implementation selected, this information can be transmitted in the form of various voltage levels (amplitude modulation) or, in the case of an alternative or additional evaluation of switchover edges, on the basis of the position of the switchover edges (phase modulation).

The transmission of additional information is utilized within the scope of a method according to the invention for a differentiation (coding) among components 12 (glow plugs 12) which are identically designed, at least in terms of the interfaces for the connection to the engine control unit 14 and for the integration into a cylinder head of the internal combustion engine 18, but which have different application properties, in that appropriately individuated identifier data is transmitted and evaluated by the engine control unit 14. Towards this end, in the case of an initial start of an internal combustion machine comprising at least a combination of a glow plug 12 with a cylinder pressure sensor 10 and an engine control unit 14, or else of a motor vehicle 20 comprising such an internal combustion machine, first of all, an electric supply voltage is applied to the cylinder pressure sensor by means of the engine control unit 14, and subsequently the internal combustion engine 18 of the internal combustion machine is started. In this context, the principle according to the invention entailing the transmission of identifier data is based on the realization that, at least within a defined period of time $t_0$ to $t_{start-up}$ (see FIGS. 2, 4 and 5) after the application of an electric supply voltage, no measurement signals of the cylinder pressure sensor 10 are needed yet since the engine control unit 14 waits until the electronic system of the cylinder pressure sensor 10 is ready to measure and/or when measurement signals of the cylinder pressure sensor 10 have to be evaluated for the first time. In this context, the principle is such that, at the beginning, a minimum period of time ($t_0$ to $t_{sensor\_reset}$) without any information on the analog interface can result from the fact that the cylinder pressure sensor 10 requires a reset time after the voltage supply has been switched on before the sensor can actually even actuate the analog interface. Moreover, the engine control unit 14 itself might need time for an initialization before the internal combustion engine 18 is started. However, when the internal combustion engine 18 starts, measurement signals of the cylinder pressure sensor 10 are absolutely necessary. For this reason, from the point in time of the start of the internal combustion engine 18, the analog interface can no longer be used for transmitting identifier data.

Fundamentally, during the period of time ($t_0$ to $t_{engine\_start}$), which is between the initial start (characterized by the application of a supply voltage to the two lines 24 provided for this purpose) and the start of the internal combustion engine 18, the analog interface can be used to transmit data other than measurement signals of the cylinder pressure sensor 10 and especially to transmit identifier data, without this entailing a disadvantage for the operation of the internal combustion engine 18. Such a disadvantage could occur, for instance, if a collision were to occur during the transmission of other data or additional data and the transmission of measurement signals of the cylinder pressure sensor 10. For this reason, according to the invention, an appropriate time-related regulation of the transmission of data from the cylinder pressure sensor 10 ensures that the transmission of the identifier data is ended or is interrupted at the latest when measurement signals of the cylinder pressure sensor 10 are needed by the engine control unit 14, which is the case when the internal combustion engine 18 is started.

The transmission of identifier data within the scope of the method according to the invention should be as robust as possible in terms of any transmission errors and decoding errors in a receiver 14 (engine control unit). Therefore, on the one hand, a high signal-to-noise ratio should be ensured during the transmission of the identifier data. Moreover, the data transmission and the decoding in the receiver 14 should be able to withstand the time-related fluctuations (caused, for example, by poorly tolerated CPU clock generators of the cylinder pressure sensors 10). The transmission of the identifier data should also be optimized in terms of the maximum required bandwidth and the computational requirements of the decoding in such a way as to make retrofitting possible in conjunction with existing engine control units 14 and in such a way that no heightened requirements are made of the on-board system of the motor vehicle 20 (in terms of the line layout, additional shielding, etc.).

Several embodiments of the method according to the invention are described below on the basis of FIGS. 2 to 5. However, mixed forms of these embodiments are also possible.

The first embodiment (see FIGS. 2 and 3) achieves a binary transmission of the identifier data with voltage signals, each of which has a voltage level that is fixed but that differs from the others, whereby only two defined voltage levels are provided for all of the voltage signals. The two different voltage levels of the voltage signals stand for logic 0 and logic 1 (0-/1-bits; binary coding). The voltage signals here have a fixed defined length (that is to say, time duration: extension along the horizontal time axis in FIG. 2). Moreover, the voltage levels of the voltage signals have also been selected in such a way that they have the greatest possible distance (along the vertical axis) with respect to each other but which, however, still fall within an output voltage range (0 to $V_{CC}$) within which (output) measurement signals of the (cylinder pressure) sensor 10 can fall during regular or error-free operation. In this manner, it is prevented that the voltage signals employed for the transmission of the identifier data fall within voltage ranges that serve, for example, for an error diagnosis. The voltage ranges here can be, for instance, those evaluated by the receiver 14 (engine control unit) as the error state (for example, signal short-circuit to the ground or short-circuit to the positive supply voltage).

After the supply voltage has been applied, the (cylinder pressure) sensor itself requires a certain time ($t_0$ to $t_{sensor\_reset}$) before it can actively provide a defined voltage level to the analog interface (e.g. due to a required reset time of the internal processors, etc.). Immediately thereafter, at least one block $B_n$ consisting of n data bits is output. A later start of the data output is possible but it would shorten the time available for the transmission of the identifier data and consequently should preferably be avoided. A data bit can consist directly of one or more 0-voltage signals or 1-voltage signals or else of combinations of 0-voltage signals and 1-voltage signals. The individual data bits can be coded one more time, for example, by means of a Manchester code or Miller code (see FIG. 3).

Optionally, the n data bits consist of one or more subblocks $B_m$ having m data bits in which the identifier data to be transmitted—but at least the useful data containing differentiating information—is contained. Owing to this redundancy of at least the useful data, the receiver 14 (engine control unit) acquires greater freedom in terms of time during the decoding of the identifier data since the receiver does not have to be ready to receive already at the beginning of the transmission of the identifier data, but rather, it only has to receive at least one complete subblock $B_m$ having m data bits so that it can carry out the desired differentiation. Moreover, a check and an error correction of the identifier data are possible if several subblocks $B_m$ having m data bits are received which can be compared to each other.

A subblock $B_m$ having m data bits can comprise not only useful data that allows an identification but also additional control signals, for example, start, stop, disconnection and/or synchronization signals or bits in order to allow the receiver 14 (engine control unit) to unambiguously identify a complete subblock $B_m$ having m data bits in the received data stream.

By the point in time $t_{start-up}$ or sooner, the data transmission is ended and the analog measurement signal of the (cylinder pressure) sensor is switched to the analog interface. In the preferred use of the method according to the invention in a combination consisting of a cylinder pressure sensor 10 and an engine control unit 14, this point in time $t_{start-up}$ can preferably be selected in such a way that it fits all of the envisaged vehicle applications (that is to say, for all vehicle applications in which such a glow plug 12 is to be used, it holds true that, until $t_{start-up}$, no measurement signals of the cylinder pressure sensor 10 are definitively evaluated or needed by the engine control unit 14).

After the point in time $t_{start-up}$, the internal combustion engine 18 starts at the point in time $t_{engine\_start}$. Beginning with this point in time $t_{engine\_start}$, the measurement signals of the cylinder pressure sensor 10 necessarily have to be evaluated and consequently must not be influenced by any transmission of identifier data.

Depending on the scaling of the block lengths m, one to any desired number of useful data bits can be transmitted. In the case of coding of a data bit by several 0- and 1-voltage levels, separate bit codings having several edge changes or bits can be implemented. Due to the then defined minimum number of edge changes, the robustness vis-à-vis variances in the bit length can be increased. The bit rate then always appears in the transmission signal as a frequency component, irrespective of the data content, and the receiver 14 (engine control unit) can then synchronize itself with respect to the time grid of the individual bits during the entire data transmission.

Figure 2:
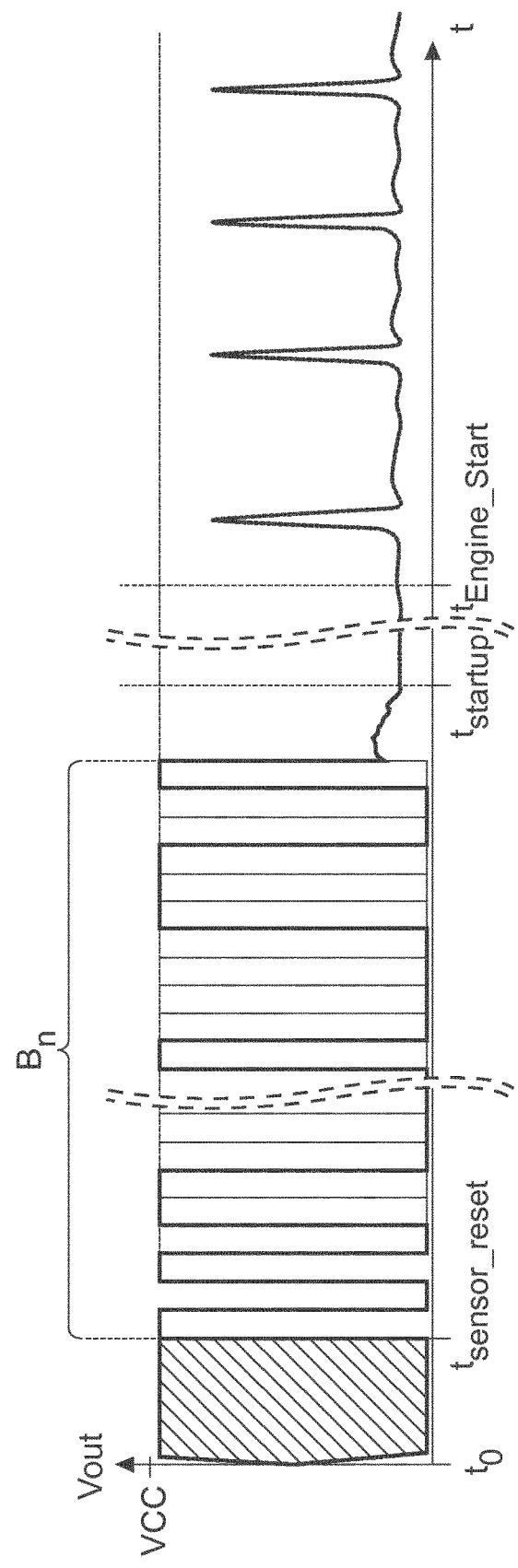
FIG. 2: a transmission of data within the scope of a method according to the invention, in accordance with a first embodiment.
Figure 3:
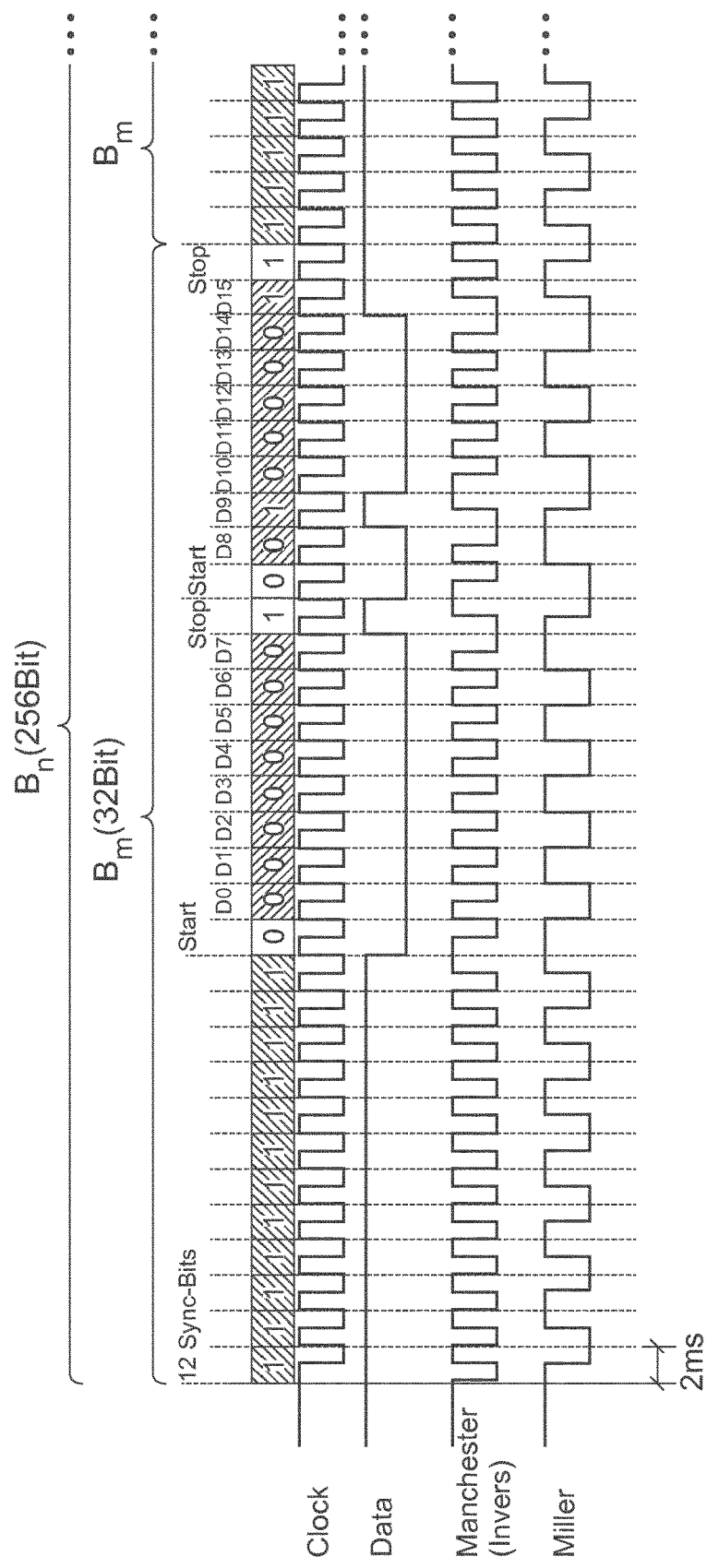
FIG. 3: possible bit coding system within the scope of a method in accordance with FIG. 2.

Examples of concrete values during the execution of a method as shown in FIGS. 2 and 3:
useful data (information): 16 bits (cross hatching slanted to the right in FIG. 3)
bit number m (block length $B_m$): 32 bits
bit-period length: 2 ms
number of repeats: 8
bit number n (block length $B_n$): 8*32 bits=256 bits
bit coding: Miller code or Manchester code (inverse)
total transmission time: 2 ms*256=0.512 s In a preferred refinement of a method as shown in FIGS. 2 and 3, it can be provided that a start of the internal combustion engine 18 is ascertained by means of the cylinder pressure sensor 10 and this information is then used as a controlled variable in order to interrupt the transmission of the identifier data. This makes it possible to prolong the period of time used for the transmission of the identifier data until the start of the internal combustion engine 18 (beginning at $t_{engine\_start}$) so that the longest possible period of time is given to the engine control unit 14 to receive the identifier data. For this purpose, also during the active transmission of the identifier data, the electronic system of the cylinder pressure sensor 10 measures the pressure in the cylinder associated with the cylinder pressure sensor 10 or in the combustion chamber of the internal combustion engine 18. A start of the internal combustion engine 18 can then be identified on the basis of characteristic pressure changes in the compression phase and/or combustion phase. As soon as the cylinder pressure sensor 10 has ascertained a first unambiguous occurrence of such a pressure change, it immediately switches the analog interface permanently over to the analog measurement signal. Since such a switchover is highly likely to take place during the transmission of a block $B_m$ having m bits, the engine control unit 14 should be configured in such a way that it identifies an incomplete block $B_m$ and discards it as one that cannot be evaluated.

Figure 4:
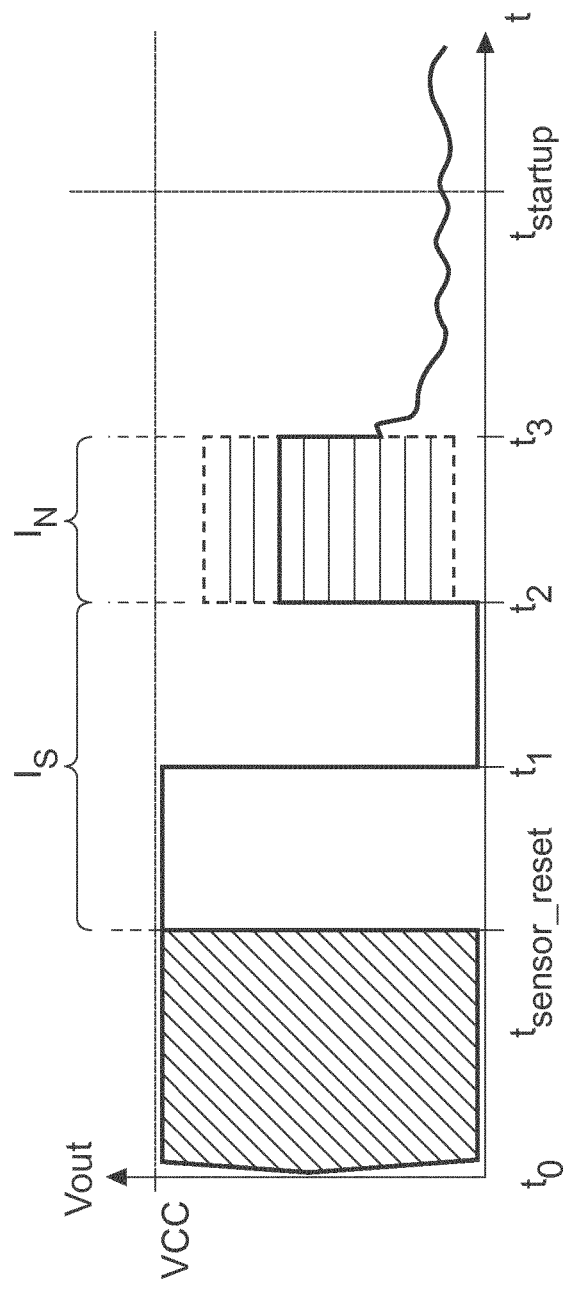
FIG. 4: a transmission of data within the scope of a method according to the invention, in accordance with a second embodiment.

In a (second) embodiment of a method according to the invention as shown in FIG. 4, analogously to the first embodiment as shown in FIGS. 2 and 3, it is provided that the electronic system of the cylinder pressure sensor 10 outputs to the analog interface a sequence of defined voltage signals having voltage levels of a fixed time duration. Here, however, unlike with the first embodiment as shown in FIGS. 2 and 3, more than two different voltage levels are defined. The same boundary conditions (e.g. largest possible distance, etc.) as in the first embodiment apply when it comes to the selection of the possible voltage levels.

In the simplest case, at least one voltage level from a selection of k different voltage levels is output within a time interval ($t_2$ to $t_3$) during the execution of the method according to the invention. The coding of the useful data takes place here under amplitude modulation via the voltage (that is to say, different voltage levels correspond to the different variants, for example, of a glow plug 12, etc.). If the number k is set at 2n, then log 2(k)=n bits can be transmitted via an output signal step.

Optionally, one or more different voltage levels can also be transmitted as a start signal $I_S$ (see FIG. 4) as a disconnect signal for the disconnection between different voltage levels carrying useful data, or as an end signal $I_E$. A start signal $I_S$ and/or a disconnect signal can improve the robustness of the information transmission since this allows the receiver 14 (engine control unit) to synchronize itself in terms of time. The time of the start of the data transmission and optionally also the length of a voltage level are made known to the receiver 14 by means of a start signal $I_S$. One or more disconnect signals fulfill the same function, namely, they improve the robustness in the case of time fluctuations of the sampling cycle since the receiver 14 can always resynchronize itself once again. An end signal $I_E$ can especially be useful if there are several different (cylinder pressure) sensors 10 with a different number of voltage levels which carry useful data and whose data is to be transmitted to the same receiver 14 (engine control unit).

The receiver 14 (engine control unit) can carry out the unambiguous sampling of the voltage levels that carry the useful data, and this is done in a time-controlled manner after a detection of the start signal $I_S$, that is to say, the receiver then knows the length of the individual voltage levels. Optionally, in order to improve the signal-to-noise ratio, individual voltage levels can also be sampled several times and filtered in the receiver 14.

According to the embodiment shown in FIG. 4, the (cylinder pressure) sensor 10 starts with the transmission of the identifier data at the earliest possible point in time ($t_{sensor\_reset}$). The period of time between $t_0$ and $t_{sensor\_reset}$ constitutes the period of time that the sensor 10 itself or its electronic system itself needs in order to be ready to transmit after it has been supplied with electric supply voltage. Between $t_{sensor\_reset}$ and $t_1$ on the one hand, and between $t_1$ and $t_2$ on the other hand, two defined, different voltage levels are output to the analog interface. This sequence serves as the start signal $I_S$. The receiver 14 can use the occurring voltage edge at $t_1$ as the reference point in time. Between $t_2$ and $t_3$, the sensor 10 applies a voltage level to the analog interface corresponding to the useful data that is to be transmitted (for example, variant of the glow plug, etc.). The receiver 14 samples this voltage level between $t_2$ and $t_3$. Starting at $t_3$, without a preceding transmission of an end signal, measurement signals of the sensor 10 are switched over from the electronic system of the sensor 10 to the analog interface.

With this embodiment as well, useful data $I_N$ that is defined in the selected voltage level that is transmitted between $t_2$ and $t_3$ can be transmitted several times, whereby then it should preferably be provided for a disconnect signal to be transmitted (not shown here) between these identical useful-data voltage levels in order to render the redundancy of the transmission of the useful data $I_N$ clearly visible to the receiver 14.

Figure 5:
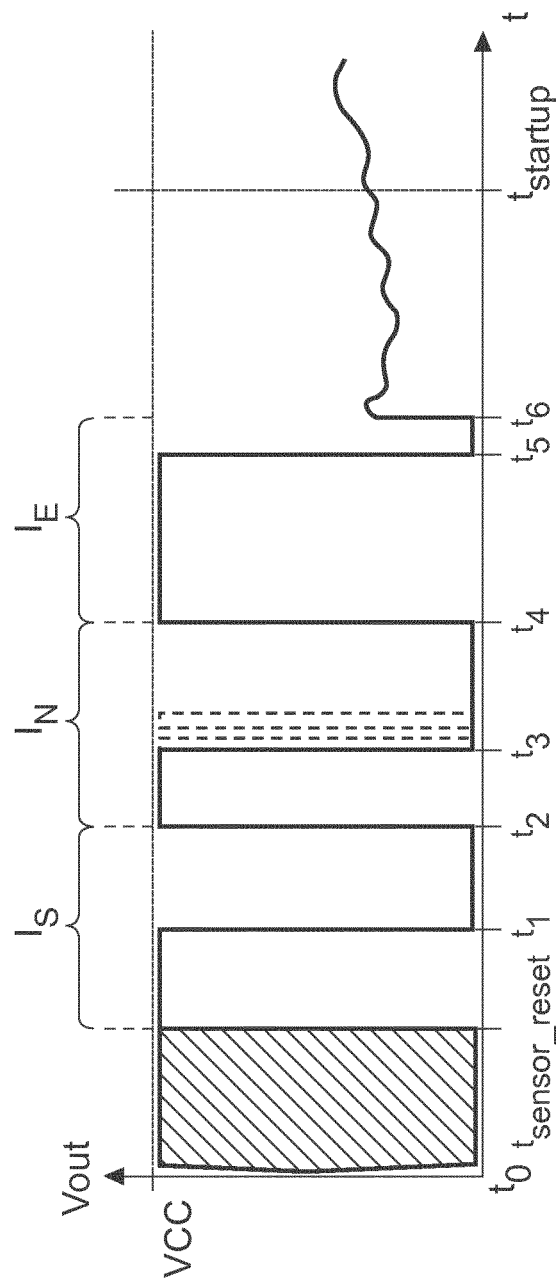
FIG. 5: a transmission of data within the scope of a method according to the invention, in accordance with a third embodiment.

In a (third) embodiment of a method according to the invention as shown in FIG. 5, analogously to the second embodiment as shown in FIG. 4, it is provided for the useful data $I_N$ (here between $t_2$ and $t_4$) to be transmitted after a preceding transmission of a start signal $I_S$ (between $t_{sensor\_reset}$ and $t_2$). Unlike with the second embodiment as shown in FIG. 4, however, it is also provided for an end signal $I_E$ to be transmitted after the transmission of the useful data $I_N$. In this context, all in all, only two different voltage levels for logic 1 and logic 0 (0-/1-bits; binary coding) are employed for the transmission of the start signal $I_S$, of the useful data $I_N$ and of the end signal $I_E$. The same boundary conditions (e.g. largest possible distance, etc.) as in the first embodiment apply when it comes to the selection of the possible voltage levels.

A time interval between $t_2$ and $t_4$ with at least one (variable) change of the signal level within this time interval serves to transmit the useful data $I_N$. Here, the coding of the useful data takes place under phase modulation by means of the phase relation of the level change within this time interval (similar to a PWM [pulse-width modulation] signal).

In this embodiment, consequently, the receiver 14 measures the edge change within a time interval (between $t_2$ and $t_4$) employed for the transmission of the useful data $I_N$ and relates it to the total length of this time interval. A start signal $I_S$ is used analogously to that of the second embodiment as shown in FIG. 4 so that the receiver 14 can unambiguously ascertain the point in time of the start of the time interval (between $t_2$ and $t_4$) employed for the transmission of the useful data $I_N$. In particular, a start signal $I_S$ shown in FIG. 5 should always be transmitted when the time interval(s) provided for the transmission of the useful data $I_N$ is/are not precisely defined and known to the receiver in order to unambiguously identify the end of the (last) time interval that carries the useful data $I_N$. The start signal $I_S$ and optionally the end signal $I_E$ should clearly differ from the voltage signals provided for the transmission of the useful data $I_N$ in order to ensure that a differentiation can be made.

In the embodiment shown in FIG. 5, the start signal $I_S$ is transmitted analogously to that of the second embodiment as shown in FIG. 4 in the time interval between $t_{sensor\_reset}$ and $t_2$. A time interval ($t_2$ to $t_4$) during which useful data $I_N$ is transmitted begins starting at the next rising edge at the point in time $t_2$. In this time interval, the subsequent falling edge of the signal curve and the next rising edge are evaluated in order to decode the useful data $I_N$. The time interval ($t_2$ to $t_4$) for the transmission of useful data $I_N$ is followed by a time interval ($t_4$ to $t_6$) within which the end signal $I_E$ is transmitted. This time interval likewise consists of two different voltage levels, whereby these, however, display a length relationship that is not provided for the coding of the useful data $I_N$ (and preferably not for the start signal $I_S$ either). In this manner, the end signal $I_E$ in the case of several pieces of useful data $I_N$ that have been transmitted redundantly (in each case according to a procedure during the time interval $t_2$ to $t_4$) can be unambiguously identified.

The embodiments as shown in FIGS. 4 and 5 are relatively simple to implement. When it comes to the data transmission, however, they only offer a limited information content since the number of modulation states for an amplitude modulation (primarily in the second embodiment as shown in FIG. 4) or for a phase modulation (primarily in the third embodiment as shown in FIG. 5) is limited by the requisite signal-to-noise ratio. In the case of the phase modulation according to the third embodiment, there are likewise additional limitations due to the relatively small bandwidth of the transmission channel since this reduces the time-related accuracy of the edge evaluation.

Regarding the robustness vis-à-vis the amplitude modulation, a binary transmission of only two voltage levels corresponding to the first and third embodiments is optimal since, as a result, the largest possible distance can be set for the employed voltage level. The transmission of a defined number of bits having a constant length according to the first embodiment also makes fewer requirements of the phase relation of the sampling times at which the information needs to be sampled (ideally in the middle of the bit). If the edges are evaluated (see FIG. 3) employing a Manchester code or Miller code, only a few different pulse-pause relationships have to be differentiated. Therefore, the requirement in terms of the time-related accuracy of the edge identification in the first embodiment as shown in FIGS. 2 and 3 is considerably less than in the case of the third embodiment as shown in FIG. 5. For these reasons, preference is given to the use of the first embodiment as shown in FIGS. 2 and 3, at least in the case of the use of the method according to the invention for transmitting data from cylinder pressure sensors 10 associated with glow plugs 12 to a receiver 14. The definition of a data container for the useful data $I_N$ here also allows a simpler standardization of the variant identification over many different cylinder pressure sensors 10. In addition, bits for error identification and error correction can be reserved in the data containers (CRC coding of the information).

LIST OF REFERENCE NUMERALS 10 (cylinder pressure) sensor
12 component/glow plug
14 receiver/engine control unit
16 glow pencil
18 internal combustion engine
20 motor vehicle
22 power output
24 line of the analog interface
26 (high-current) line
$B_n$ block with n bits
$B_m$ subblock with m bits
$I_S$ start signal
$I_N$ useful data
$I_E$ end signal

The invention claimed is:

1. A method for transmitting data from a sensor associated with an internal combustion engine to a receiver by means of an analog interface, comprising:
   during a first period of time, transmitting, by the sensor, identifier data for identifying the type of the sensor and/or for identifying the type of a component associated with the sensor,
   transmitting measurement signals of the sensor after the first period of time; and
   identifying a specific sensor and/or a specific component that is associated with the sensor from a group of multiple sensors and/or from a group of multiple components, whereby the multiple sensors of the appertaining group and/or the multiple components of the appertaining group have mechanically identical interfaces.

2. The method according to claim 1, wherein the identifier data comprises a start signal and/or an end signal and/or a synchronization signal and/or a disconnect signal.

3. The method according to claim 1, wherein the identifier data is transmitted in the form of a sequence of two or more voltage signals having different voltage levels,
   whereby the voltage levels can have identical or different lengths, and
   whereby different sequences of the voltage signals and/or voltage levels of different magnitudes and/or voltage levels of different lengths define different types of sensors and/or types of components associated with the sensors.

4. The method according to claim 3, wherein the voltage levels are within a defined voltage level range, and wherein the voltage levels are at the greatest possible distance from each other.

5. The method according to claim 3, wherein the voltage levels fall within an output voltage range of the measurement signals.

6. The method according to claim 3, wherein at least one block (Bm, Bn) containing several data bits is transmitted, whereby a data bit comprises one or more voltage signals.

7. The method according to claim 6, wherein the data bits are coded.

8. The method according to claim 6, wherein the at least one block ($B_n$) containing several data bits comprises several subblocks ($B_m$) that each contain several data bits, whereby the data bits of the subblocks ($B_m$) are identical.

9. The method according to claim 1, wherein the identifier data is transmitted during an initialization phase and the transmission of the identifier data already has ended or is ended by the end of the initialization phase.

10. The method according to claim 9, wherein the end of the initialization phase is reached as soon as the sensor has reached measuring readiness.

11. The method according to claim 1, wherein data from a cylinder pressure sensor, which is especially integrated into a glow plug of an internal combustion engine, is transmitted to the receiver.

12. The method according to claim 11, wherein the end of the initialization phase is reached as soon as the cylinder pressure sensor has detected a start of the internal combustion engine.

13. The method according to claim 12, wherein the start of the internal combustion engine is ascertained on the basis of a defined pressure rise in a combustion chamber that is associated with the cylinder pressure sensor.

\* \* \* \* \*